United States Patent
Irie (10) Patent No.: US 7,089,111 B2
(45) Date of Patent: Aug. 8, 2006

(54) VEHICLE NAVIGATION SYSTEM AND ROUTE GUIDANCE METHOD

(75) Inventor: Takashi Irie, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 11/193,420

(22) Filed: Aug. 1, 2005

(65) Prior Publication Data

US 2005/0261831 A1 Nov. 24, 2005

Related U.S. Application Data (62) Division of application No. 10/790,035, filed on Mar. 2, 2004.

(30) Foreign Application Priority Data

Mar. 20, 2003 (JP) ............................... 2003-78334

(51) Int. Cl.
*G01C 21/34* (2006.01)
(52) U.S. Cl. .................... 701/211; 340/995.2
(58) Field of Classification Search ............ None
See application file for complete search history.

(56) References Cited

U.S. PATENT DOCUMENTS

| | | | | |
|---|---|---|---|---|
| 5,410,486 A | * | 4/1995 | Kishi et al. ............... 701/211 |
| 5,774,071 A | * | 6/1998 | Konishi et al. ............ 340/988 |
| 5,893,045 A | | 4/1999 | Kusama et al. |
| 5,904,728 A | * | 5/1999 | Tamai et al. ............... 701/211 |
| 6,263,277 B1 | * | 7/2001 | Tanimoto et al. .......... 701/209 |
| 6,278,943 B1 | * | 8/2001 | Yamauchi ................... 701/211 |
| 6,347,280 B1 | * | 2/2002 | Inoue et al. ................ 701/211 |

FOREIGN PATENT DOCUMENTS

JP 2000-39330 A 2/2000

* cited by examiner

Primary Examiner—Michael J. Zanelli
(74) Attorney, Agent, or Firm—Birch, Stewart, Kolasch & Birch, LLP (57) ABSTRACT

A vehicle navigation system includes a road-between-guidance-target-points configuration determining unit (9) for determining a configuration of a road between two successive guidance target points whose information is extracted from information stored in a guidance target point storing unit (8). A continuous guidance threshold distance setting unit (10) sets a threshold distance for continuous guidance based on the road configuration by using a table or the like. A distance-between-guidance-target-points calculating unit (11) calculates a distance between the two successive guidance target points. When the calculated distance between the two successive guidance target points is shorter than the set threshold distance for continuous guidance, a route guidance unit (12) provides continuous guidance for users through a guidance unit (16).

5 Claims, 5 Drawing Sheets

— — — : CASE WHERE SINGLE GUIDANCE ON FIRST GUIDANCE TARGET INTERSECTION IS PROVIDED

———— : CASE WHERE CONTINUOUS GUIDANCE ON FIRST GUIDANCE TARGET INTERSECTION IS PROVIDED

VEHICLE NAVIGATION SYSTEM AND ROUTE GUIDANCE METHOD

This application is a Divisional of co-pending application Ser. No. 10/790,035 filed on Mar. 2, 2004, and for which priority is claimed under 35 U.S.C. § 120; and this application claims priority of Application No. JP 2003-78334 filed in Japan on Mar. 20, 2003 under 35 U.S.C. § 119; the entire contents of all are hereby incorporated by reference.

BACKGROUND OF THE INVENTION

1. Field of the Invention

The present invention relates to a navigation system for vehicle and a route guidance method that enable a driver who is driving a vehicle on a road to safely and smoothly pass through guidance target points such as intersections.

2. Description of Related Art

A prior art navigation system for vehicle has a function of continuously providing guidance for a driver who is driving a vehicle on a road. When the vehicle has to continuously make a right-hand turn or left-hand turn two or more times while traveling within a region located at a predetermined distance from the current position of the vehicle, by using the continuously guidance function, the prior art navigation system provides guidance on a first guidance target point and simultaneous guidance on a second guidance target point, such as "Make a right-hand turn 100 m ahead and then make a left-hand turn", before the vehicle reaches the first guidance target point. In this case, the prior art navigation system determines whether or not a distance between two successive guidance target points is equal to or less than a threshold distance and, when the distance is equal to or less than the threshold distance, provides such continuous guidance.

The above-mentioned threshold distance can be arbitrarily set. However, when the threshold distance is set to a long one, the prior art navigation system may often provide continuous guidance needlessly and therefore redundant guidance can cause the driver to have momentary lapses of attention for the first guidance target intersection at which the driver has to make a turn. In contrast, when the threshold distance is set to a short one, essentially needed continuous guidance cannot be provided and the driver may often have an inconvenience of being forced to make a sudden lane change or right or left hand turn after the vehicle has passed through the first guidance target intersection.

Thus, the setting of the threshold distance for continuous guidance is important and it is therefore desirable that the set threshold distance complies with the road on which the vehicle is traveling. In accordance with a prior art method of providing continuous guidance in consideration of the suitability of the threshold distance for the road on which the vehicle is traveling, the threshold distance for continuous guidance is properly preset according to a difference between "general road" and "highway", each of which can be an attribute of the road between the two successive guidance target intersections (for example, refer to Japanese patent application publication (TOKKAI) No. 2000-39330).

Thus, the prior art continuous guidance method has the step of using the threshold distance for continuous guidance that is properly set according to a difference between "general road" and "highway". However, in accordance with this prior art continuous guidance method, the threshold distance for continuous guidance is kept at constant for the road on which the vehicle is traveling, and is not set so that it suits with conditions of the road. For example, a problem with the prior art continuous guidance method is that when the vehicle is traveling on a general road, the setting of the threshold distance cannot be implemented in consideration of the configurations of various intersections on the general road. A further problem is that even when the vehicle is traveling on a highway, the setting of the threshold distance cannot be implemented in consideration of a configuration of the highway.

SUMMARY OF THE INVENTION

The present invention is proposed to solve the above-mentioned problems, and it is therefore an object of the present invention to provide a vehicle navigation system for and a route guidance method of, when there exist continuous guidance target points on a searched-for route, providing appropriate and continuous guidance according to a configuration or conditions of a road on which a vehicle is traveling, thereby making it possible for drivers to pass though intersections safely and smoothly.

In accordance with the present invention, there is provided a vehicle navigation system provided with a guidance target storing unit for storing information about guidance target points, which is extracted from information about a preset route extending from a current position of a vehicle to a destination and which is based on map information, and a guidance unit for providing guidance on the route by voice or with display, the system including: a road-between-guidance-target-points configuration determining unit for determining a configuration of a road between two successive guidance target points whose information is extracted from the information stored in the guidance target storing unit; a continuous guidance threshold distance setting unit for setting a threshold distance for continuous guidance based on the road configuration determined by the road-between-guidance-target-points configuration determining unit; a distance-between-guidance-target-points calculation unit for calculating a distance between the two successive guidance target points whose information is extracted from the information stored in the guidance target storing unit; and a route guidance unit for providing continuous guidance through the guidance unit when the calculated distance between the two successive guidance target points is shorter than the threshold distance for continuous guidance set by the continuous guidance threshold distance setting unit.

As a result, when two or more guidance target points successively exist on a road on which the vehicle is traveling, the vehicle navigation system can provide appropriate and continuous guidance for the driver according to a configuration of the road on which the vehicle is traveling. Therefore the vehicle navigation system can prevent the driver from making sudden lane changes and can also prevent needless continuous guidance, so that the driver can pass through intersections safely and smoothly.

Further objects and advantages of the present invention will be apparent from the following description of the preferred embodiments of the invention as illustrated in the accompanying drawings.

DETAILED DESCRIPTION OF THE PREFERRED EMBODIMENTS

The invention will now be described with reference to the accompanying drawings.

Embodiment 1

Figure 1:
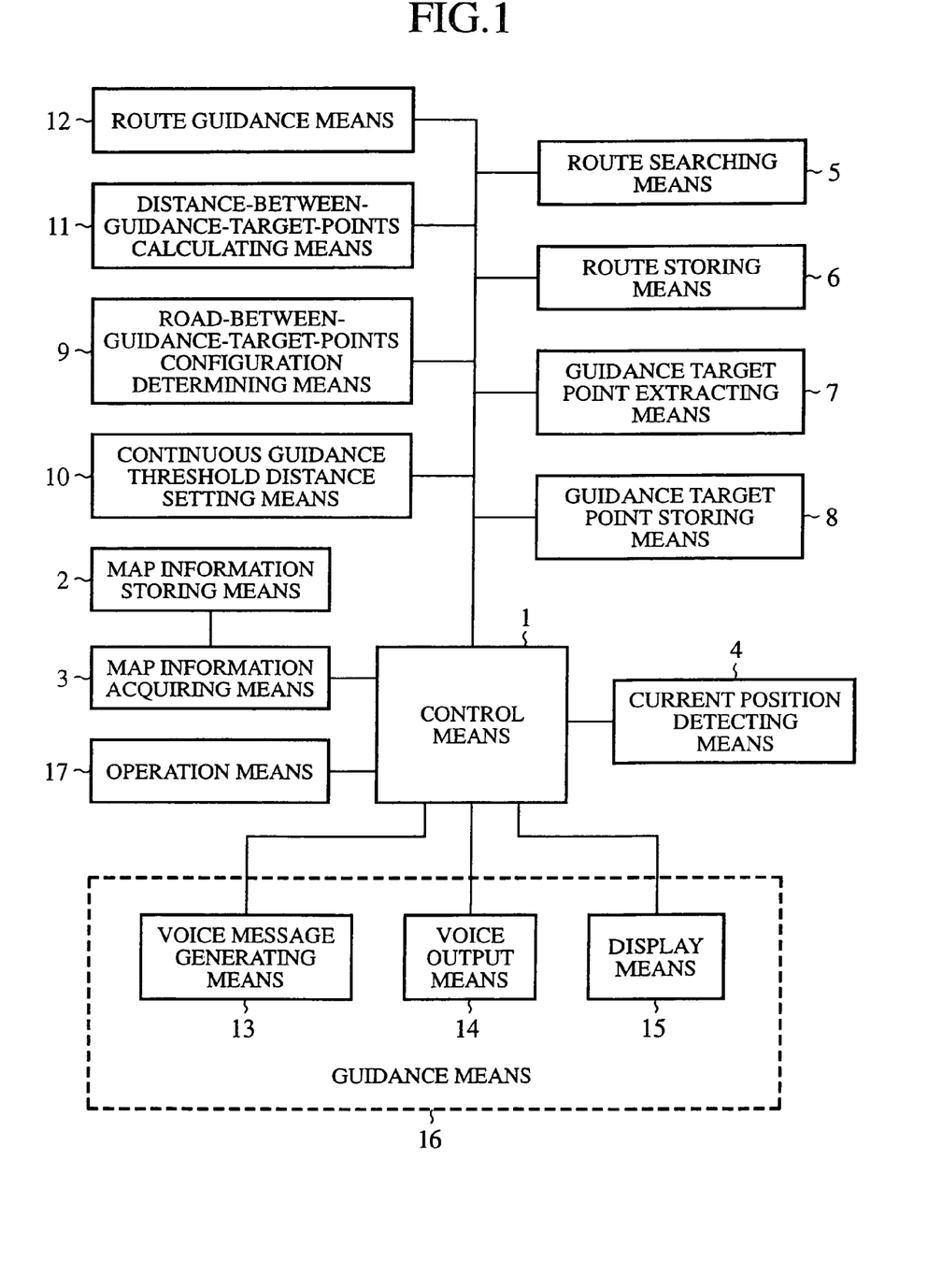
FIG. 1 is a block diagram showing the functional configuration of a vehicle navigation system in accordance with embodiment 1 of the present invention.

FIG. 1 is a block diagram showing the functional configuration of a vehicle navigation system in accordance with embodiment 1 of the present invention. In the figure, a map information storing unit 2, a map information acquiring unit 3, a current position detecting unit 4, a route searching unit 5, a route storing unit 6, a guidance target point extracting unit 7, a guidance target point storing unit 8, road-between-guidance-target-points configuration determining unit 9, a continuous guidance threshold distance setting unit 10, distance-between-guidance-target-points calculating unit 11, a route guidance unit 12, a guidance unit 16 provided with voice message generating unit 13, a voice output unit 14, and a display unit 15, and an operation unit 17 are connected to a control unit 1.

The control unit 1 controls various calculations and the whole of the navigation system. The map information storing unit 2 stores digitalized map data, such as link data and node data. The map information acquiring unit 3 acquires map information stored in the map information storing unit 2. The current position detecting unit 4 detects the current position of a moving object (e.g., a vehicle) in which the navigation system is mounted. The route searching unit 5 sets a route between two points, i.e., between the vehicle's current point indicating the current position of the vehicle and defined by map data stored in the map information storing unit 2 and a destination point. The route storing unit 6 then stores the route set by the route searching unit 5 therein.

The guidance target point extracting unit 7 extracts information about guidance target points, such as guidance target intersections, for each of which guidance needs to be provided, for the route whose information is stored in the route storing unit 6. Hereafter, the preferred embodiments of the present invention will be explained by taking guidance target intersections as an example of guidance target points. The guidance target point storing unit 8 then stores the information about the guidance target intersections whose information is extracted by the guidance target point extracting unit 7. The road-between-guidance-target-points configuration determining unit 9 determines a configuration of each of roads associated with the guidance target intersections on each of which determination of whether or not continuous guidance is to be provided is performed. The continuous guidance threshold distance setting unit 10 sets a threshold distance for continuous guidance on each road according to the road configuration determined by the road-between-guidance-target-points configuration determining unit 9.

The distance-between-guidance-target-points calculating unit 11 calculates a distance between any two successive ones of all the guidance target intersections on each of which determination of whether or not continuous guidance is to be provided is performed. The route guidance unit 12 performs control operations, such as determination of whether continuous guidance or single guidance is to be provided and determination of the direction in which the vehicle should travel when the vehicle reaches each of the guidance target intersections, on each of all the guidance target intersections stored in the guidance target point storing unit 8. The voice message generating unit 13 has voice information storing unit for storing words, phrases, and so on required for generating voice guidance messages, as voice waveform data, and, when the navigation system provides voice guidance, selects voice waveform data about words, phrases, and so on indicating a guidance message corresponding to the voice guidance, and combines them so as to generate a voice guidance message.

The voice output unit 14 informs the user of the guidance message generated by the voice message generating unit 13 by voice. The display unit 15 displays both a map stored in the map information storing unit 2 and the route stored in the route storing unit 6. When the vehicle approaches one of all the guidance target intersections stored in the guidance target point storing unit 8, the display unit 15 enlarges and displays the map including a region that is located in the vicinity of the guidance target intersection. The operation unit 17 has switches through which the user (i.e., the driver) is allowed to operate the vehicle navigation system when the user presets the destination, for example. The operation unit 17 receives and manages input signals generated by those switches.

Figure 2:
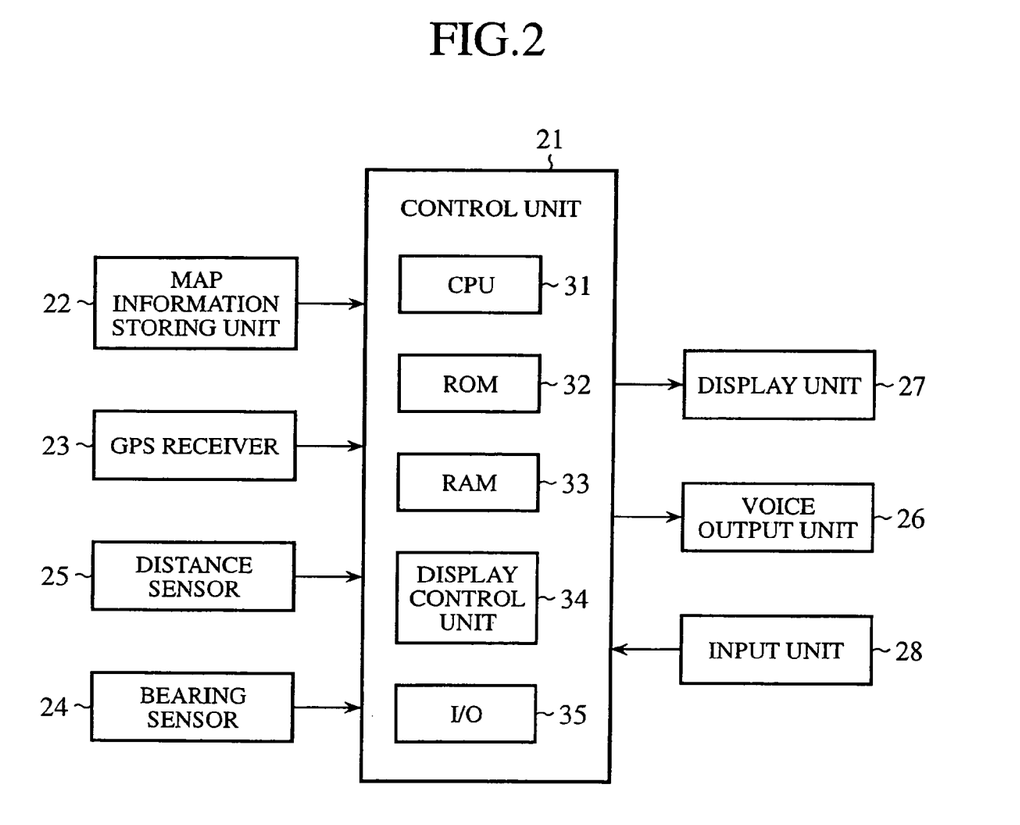
FIG. 2 is a block diagram showing the hardware configuration of the vehicle navigation system in accordance with embodiment 1 of the present invention.

FIG. 2 is a block diagram showing the hardware configuration of the navigation system, which corresponds to the functional configuration of FIG. 1. As shown in FIG. 2, a map information storing unit 22, a GPS (Global Positioning System) receiver 23, a bearing sensor 24, a distance sensor 25, a voice output unit 26, a display 27, and an input device 28 are connected to a control unit 21.

The control unit 21 corresponds to the control unit 1 of FIG. 1, and performs control of the whole of the navigation system and various calculations. The map information storing unit 22 corresponds to the map information storing unit 2 of FIG. 1, and is provided with a DVD-ROM (digital versatile disc-read only memory) for storing digitalized map data and a reading unit for reading data from the DVD-ROM. The GPS receiver 23 receives electric waves from satellites so as to detect the current position of the moving object (e.g., a vehicle) in which the navigation system is mounted. The bearing sensor 24 is a sensor that detects the direction (i.e., the heading) in which the moving object is traveling. The distance sensor 25 is a sensor that detects the distance traveled by the moving object. The combination of the GPS receiver 23, the bearing sensor 24, and the distance sensor 25 corresponds to the current position detecting unit 4 of FIG. 1.

The voice output unit 26 corresponds to the voice output unit 14 of FIG. 1, and outputs a guidance message or the like by voice. The display 27 corresponds to the display unit 15 of FIG. 1, and is provided with a liquid crystal display or the like, for example. The display 27 displays map information, the route, guidance messages, and so on. The input device 28 corresponds to the operation unit 17 of FIG. 1, and generates and outputs signals when the user operates this input device 28 so as to cause the navigation system to perform desired operations.

The control unit 21 is provided with a CPU (central processing unit) 31, a ROM (read only memory) 32, a RAM (random access memory) 33, a display control unit 34, and an I/O unit (input/output unit) 35. The CPU 31 performs calculations for route searching, extracting of information about guidance target intersections and so on. The ROM 32 stores program constants and so on which the CPU 31 uses when performing operations. In other words, the ROM 32 stores a program associated with continuous guidance, which will be described later, in addition to other original programs used for performing navigation operations, such as searching for a route from the current position of the vehicle to the destination and guidance that is provided for the user while the vehicle is traveling along the route searched for.

While the CPU 31 performs operations, a program, map data, and so on are expanded into the RAM 33 or calculation results are written into the RAM 33. The display control unit 34 controls the display 27. The I/O unit 35 interfaces between the control unit 21 and the external various units 22 to 28. The map information acquiring unit 3, the route searching unit 5, the route storing unit 6, the guidance target point extracting unit 7, the guidance target point storing unit 8, the road-between-guidance-target-points configuration determining unit 9, the continuous guidance threshold distance setting unit 10, the distance-between-guidance-target-points calculating unit 11, the route guidance unit 12, the voice message generating unit 13, etc. as shown in FIG. 2 are implemented via processes performed by the control unit 21.

Next, the basic operation of the whole of the navigation system will be explained with reference to FIG. 1. Before starting driving the vehicle, the user can operate the switches of the operation unit 17 so as to input and set desired data, such as a destination, to the navigation system. The current position detecting unit 4 detects the current position of the vehicle. On the other hand, map data are stored in the map information storing unit 2, and the map information acquiring unit 3 acquires necessary map information from the map information storing unit 2. The route searching unit 5 searches for a route from the detected current position of the vehicle to the destination input and set through the operation unit based on those map data, and sets the route to the vehicle navigation system. The set route between the two points, i.e., between the current position and the destination is stored in the route storing unit 6. The guidance target point extracting unit 7 extracts information about guidance target intersections for which guidance needs to be provided from information about the route stored in the route storing unit 6. The extracted information about the guidance target intersections is then stored in the guidance target point storing unit 8.

The route guidance unit 12 determines whether or not continuous guidance is to be provided for each of all the guidance target intersections whose information is stored in the guidance target point storing unit 8. The determination performed by the route guidance unit 12 will be described later. The display unit 15 displays a map stored in the map information storing unit 2, the route between the two points stored in the route storing unit 6, an enlarged map of a region located in the vicinity of a guidance target point whose information is stored in the guidance target point storing unit 8 when the vehicle approaches the guidance target point, and so on, or displays them for guidance. Furthermore, when the vehicle approaches a guidance target point, the voice output unit 14 outputs a corresponding voice guidance message generated by the voice message generating unit 13 and provides the voice guidance message for the driver. The control of the above-mentioned operations is carried out by the control unit 1.

Figure 3:
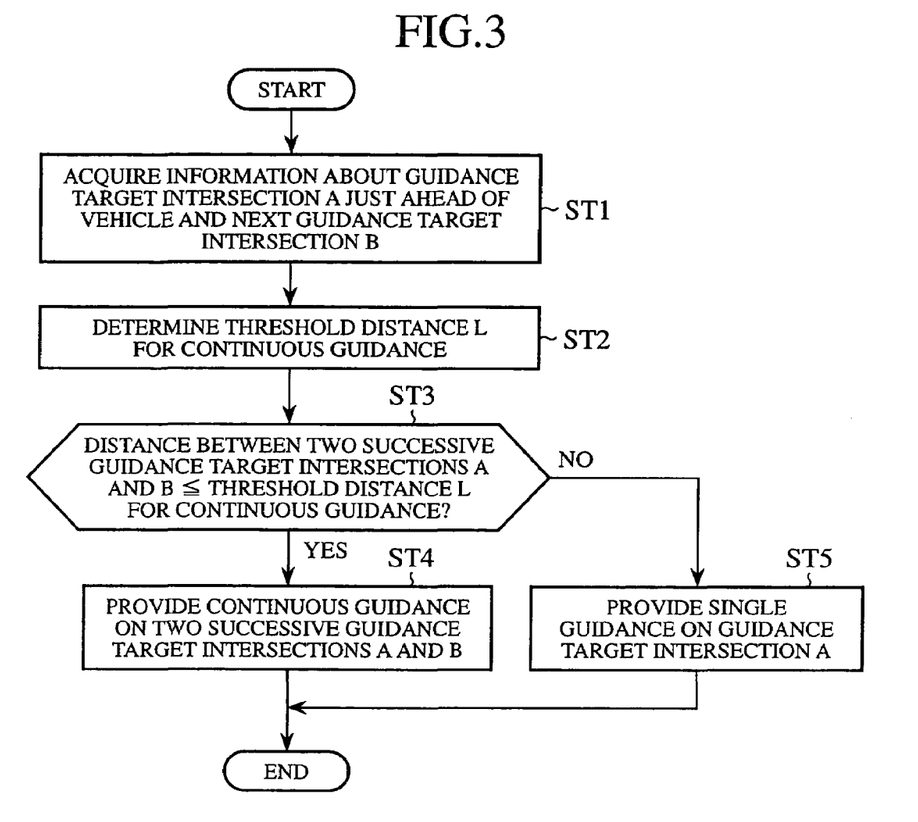
FIG. 3 is a flow chart showing continuous guidance processing performed by the vehicle navigation system in accordance with embodiment 1 of the present invention.

Next, the determination process of determining whether or not continuous guidance is to be provided for each of the guidance target intersections will be explained with reference to FIG. 3. FIG. 3 is a flow chart showing an example of the determination process of determining whether or not continuous guidance is to be provided for each of the guidance target intersections. The process shown in FIG. 3 includes the step of determining whether or not the route guidance unit 12 needs to provide continuous guidance for each of the guidance target intersections whose information is stored in the guidance target point storing unit 8, and the step of providing guidance on each of the guidance target intersections when determining that the route guidance unit 12 needs to provide continuous guidance for each of the guidance target intersections.

The road-between-guidance-target-points configuration determining unit 9, in step ST1, acquires the following information I about both a first guidance target intersection A that is located just ahead of the vehicle, and a second guidance target intersection B that is located ahead of the vehicle and is next to the first guidance target intersection A, the information about the two successive guidance target intersections A and B being stored in the guidance target point storing unit 8.

(Information I): the number of lanes of a link between the two successive guidance target intersections A and B.

The reason why the acquired information I is the number of lanes is because when the link between the two successive guidance target intersections A and B has many lanes, there is a possibility that the driver makes a lane change many times and it is necessary to set the threshold distance L for continuous guidance to a long one in the following steps.

Figure 4:
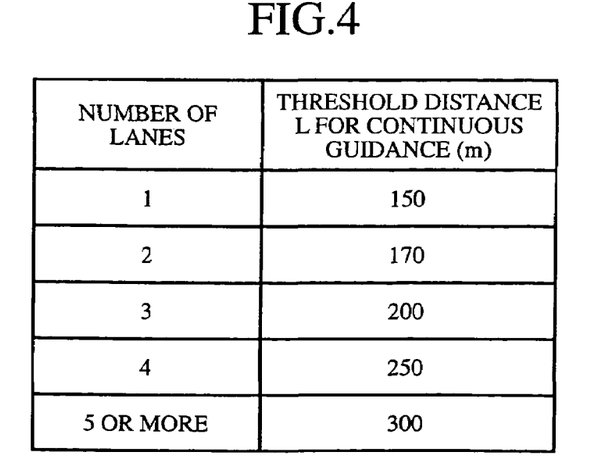
FIG. 4 is an example of a table showing a relationship between the number of lanes and a threshold distance L for continuous guidance, in order to explain the flow chart of FIG. 3.

The continuous guidance threshold distance setting unit 10 then, in step ST2, determines the threshold distance L for continuous guidance based on the information about the number of lanes of the link between the two successive guidance target intersections A and B acquired in step ST1, by using a table, as illustrated in FIG. 4, showing a relationship between the number of lanes of the link between the two successive guidance target intersections and the threshold distance L for continuous guidance.

The distance-between-guidance-target-points calculating unit 11, in step ST3, calculates the distance between the two successive guidance target intersections A and B, and the route guidance unit 12 compares this calculated distance with the threshold distances L for continuous guidance determined in step ST2. When the comparison result shows that the distance between the two successive guidance target intersections A and B is equal to or less than the threshold distance L for continuous guidance (i.e., when YES in step ST3), the route guidance unit 12 advances to step ST4 in which the route guidance unit 12 provides continuous guidance (e.g., a voice message or the like), such as "Make a right hand turn 100 m ahead and then make a left hand turn at the next intersection", through the guidance unit 16, for example.

In contrast, when the comparison result shows that the distance between the two successive guidance target intersections A and B is greater than the threshold distance L for continuous guidance (i.e., when NO in step ST3), the route guidance unit 12 advances to step ST5 in which the route guidance unit 12 provides single guidance, such as "Make a right hand turn 100 m ahead" through the guidance unit 16, for example.

As previously mentioned, the information I acquired in step ST1 is the number of lanes of the link between the two successive guidance target intersections A and B. As an alternative, the road-between-guidance-target-points configuration determining unit 9 can acquire the following information instead of the number of lanes of the link, and can determine the threshold distance L for continuous guidance based on the information, in step ST2.

(1) The width of the road between the two successive guidance target intersections A and B.

The reason why the acquired information is the road width (i.e., the width of the road) is because when the road width is large, there is a high possibility that the driver makes a lane change many times and it is therefore preferable that the threshold distance L for continuous guidance is set to a longer one.

(2) The difference between the direction in which the vehicle will be headed at the first guidance target intersection A and that in which the vehicle will be headed at the second guidance target intersection B.

The reason why the acquired information is the difference between the headings at the guidance target intersections A and B is because when the difference between the headings at the guidance target intersections A and B is equal to or larger than a predetermined value (for example, when the headings are opposite to each other, such as when the vehicle will make a right hand turn at one of the guidance target intersections A and B and will make a left hand turn at the other guidance target intersection), there is a high possibility that the driver makes a lane change and it is therefore preferable that the threshold distance L for continuous guidance is set to a longer one.

(3) The angle (referred to as the turn angle) with which the vehicle will make a turn at the first guidance target intersection A.

The reason why the acquired information is the turn angle is because when the turn angle at the first guidance target intersection A is equal to or less than a predetermined value, there is a possibility that the vehicle will be traveling in a substantially straight line along a highway, for example, and will pass through the first guidance target intersection and arrive at the second guidance target intersection in a short time, and it is therefore preferable that the threshold distance L for continuous guidance is set to a longer one.

In step ST2, instead of using the table, the continuous guidance threshold distance setting unit 10 can set the threshold distance L for continuous guidance by using either of the following methods:

(1) When the number of lanes, the road width or the difference between the headings at the guidance target intersection A and B, which is acquired in step ST1, is equal to or greater than a predetermined value or when the turn angle at the first guidance target intersection, which is acquired in step ST1, is equal to or less than a predetermined value, the continuous guidance threshold distance setting unit 10 can set the threshold distance L for continuous guidance to longer than a reference distance. In contrast, when the number of lanes, the road width or the difference between the headings at the guidance target intersection A and B is less than the predetermined value or when the turn angle at the first guidance target intersection is greater than the predetermined value, the continuous guidance threshold distance setting unit 10 can set the threshold distance L for continuous guidance to shorter than the reference distance. The continuous guidance threshold distance setting unit 10 then prestores the set threshold distance L for continuous guidance therein. The reference distance is set in advance, and the continuous guidance threshold distance setting unit 10 can correct the reference distance based on the information acquired in step ST1, as previously mentioned.

(2) The continuous guidance threshold distance setting unit 10 prestores a relational expression that associates either of the number of lanes, the road width, the difference between the headings at the guidance target intersections A and B, or the turn angle at the first guidance target intersection with the threshold distance L for continuous guidance, and calculates and sets the threshold distance L for continuous guidance corresponding to the actual information acquired in step ST1 according to the above-mentioned relational expression. For example, in the case of the number of lanes, the continuous guidance threshold distance setting unit 10 has such a relational expression as "threshold distance L for continuous guidance=the number of lanes*100 m". As a result, when the number of lanes of the road is 1, the continuous guidance threshold distance setting unit 10 sets the threshold distance L for continuous guidance to 100 m, and when the number of lanes of the road is 4, the continuous guidance threshold distance setting unit 10 sets the threshold distance L for continuous guidance to 400 m. The continuous guidance threshold distance setting unit 10 can be provided with a similar relational expression for each of the road width, the difference between the headings at the guidance target intersections A and B, and the turn angle at the first guidance target intersection.

The above explanation of embodiment 1 provided by referring to FIG. 3 is given by taking the navigation system (i.e., a product) as an example. Furthermore, in accordance with embodiment 1, a route guidance method which this navigation system employs can include the processes as shown in FIG. 3. In other words, step ST1 is the process of determining a configuration of the road between the two successive guidance target intersections A and B whose information is extracted from the guidance target point storing unit 8, and step ST2 is the process of setting the threshold distance L for continuous guidance based on the road configuration determined in step ST1. Furthermore, step ST3 is the process of calculating the distance between the two successive guidance target intersections A and B whose information is extracted from the guidance target point storing unit 8, and steps ST3 and ST4 are the process of providing continuous guidance for the user through the guidance unit 16 when the calculated distance between the two successive guidance target intersections A and B is equal to or shorter than the set threshold distance L for continuous guidance. Steps ST3 and ST5 are the process of providing single guidance for the user through the guidance unit 16 when the calculated distance between the two successive guidance target intersections A and B is longer than the set threshold distance L for continuous guidance.

Figure 5:
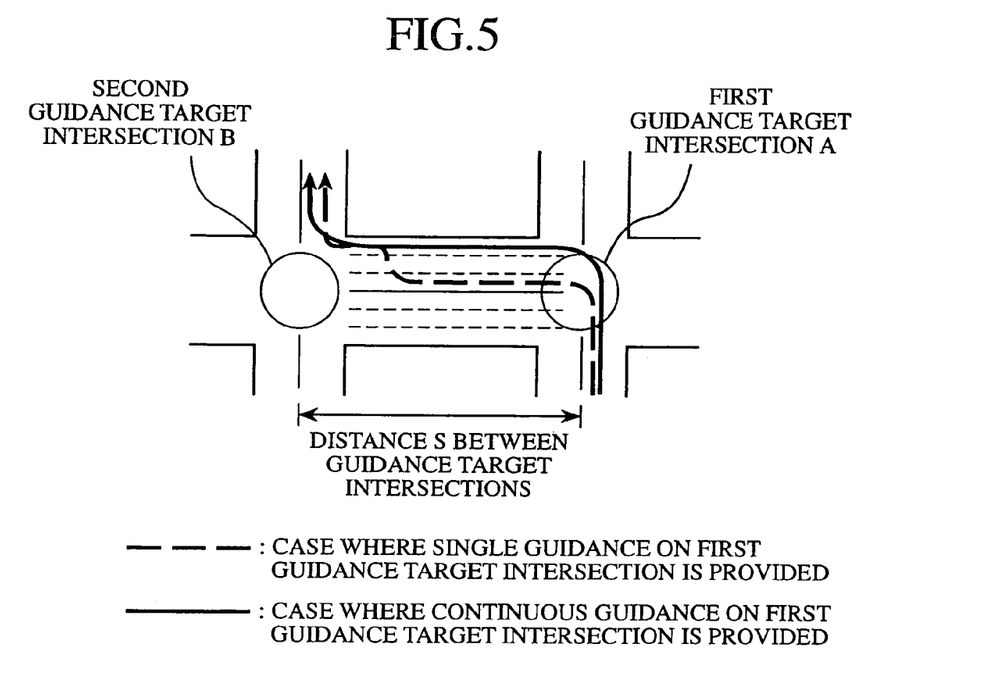
FIG. 5 is an explanatory diagram showing an advantage offered by continuous guidance provided by the vehicle navigation system in accordance with embodiment 1 of the present invention.

For example, when the road between the two successive guidance target intersections A and B has three lanes, as shown in FIG. 5, such single guidance at the first guidance target intersection A as "Make a left hand turn" can cause the driver to drive the vehicle along a path designated by a dotted line, and can force the driver to make a lane change immediately before the vehicle reaches the second guidance target intersection B that is closer to the destination than the first guidance target intersection A. In contrast, in accordance with embodiment 1, when the road between the two successive guidance target intersections A and B has a larger number of lanes as shown in FIG. 5, even if the distance S between the two successive guidance target intersections A and B is longer than a conventionally-set threshold distance for continuous guidance, the route guidance unit 12 can provide continuous guidance, such as "Make a left hand turn and then make a right hand turn at the next intersection", so that the driver can determine that he or she should drive the vehicle along a lane designated by a solid line in advance. In addition, even when the vehicle is traveling on a wide road and the driver is forced to make a lane change or even when the difference between the direction in which the vehicle will be headed at the first guidance target intersection and that in which the vehicle will be headed at the second guidance target intersection is large, the route guidance unit 12 can provide continuous guidance, so that the driver can determine the direction in which the vehicle should be headed in advance.

Figure 6:
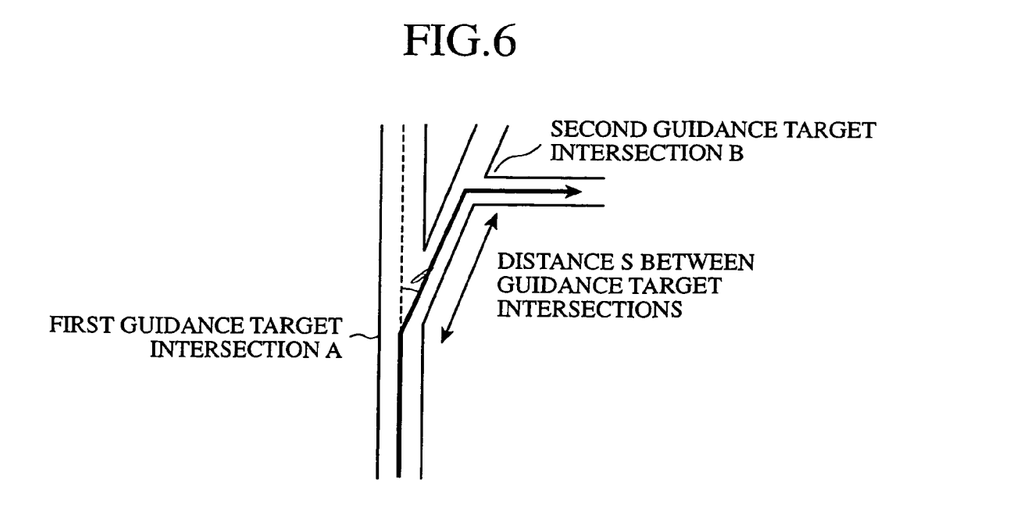
FIG. 6 is another explanatory diagram showing the advantage offered by continuous guidance provided by the vehicle navigation system in accordance with embodiment 1 of the present invention.

When the turn angle θ at the first guidance target intersection A is small, as shown in FIG. 6, because there is a possibility that the vehicle passes through the first guidance target intersection A without slowing down and reaches the second guidance target intersection B in a short time, such single guidance at the first guidance target intersection A as "Make a right hand turn" can leave the driver little time for making a right hand turn at the second guidance target intersection B. In contrast, in accordance with embodiment 1, when the turn angle θ at the first guidance target intersection A is small, as shown in FIG. 5, even if the distance S between the two successive guidance target intersections A and B is longer than a conventionally-set threshold distance for continuous guidance, the route guidance unit 12 can provide continuous guidance, such as "Make a right hand turn and then make a right hand turn at the next intersection", so that the driver can drive the vehicle to pass through the second guidance target intersection B while keeping calm.

As mentioned above, in accordance with this embodiment 1, the vehicle navigation system determines a configuration of a road between two successive guidance target intersections on each of which determination of whether or not continuous guidance is to be provided is performed according to either of the number of lanes of the road, the road width, the difference between the headings at the two successive guidance target intersections, or the turn angle at the first one of the two successive guidance target intersections, sets a threshold distance L for continuous guidance according to the determined road configuration by using a conversion table or by using a method of correcting a predetermined reference distance, or the like, calculates the distance between the two successive guidance target intersections, and provides continuous guidance for the driver when the calculated distance between the two successive guidance target intersections is shorter than the threshold distance L for continuous guidance. When two or more guidance target intersections successively exist on the road on which the vehicle is traveling, the vehicle navigation system can provide appropriate and continuous guidance for the driver according to the configuration of the road. Therefore, the vehicle navigation system can prevent the driver from making sudden lane changes and can also prevent needless continuous guidance, so that the driver can pass through intersections safely and smoothly.

Embodiment 2

Figure 7:
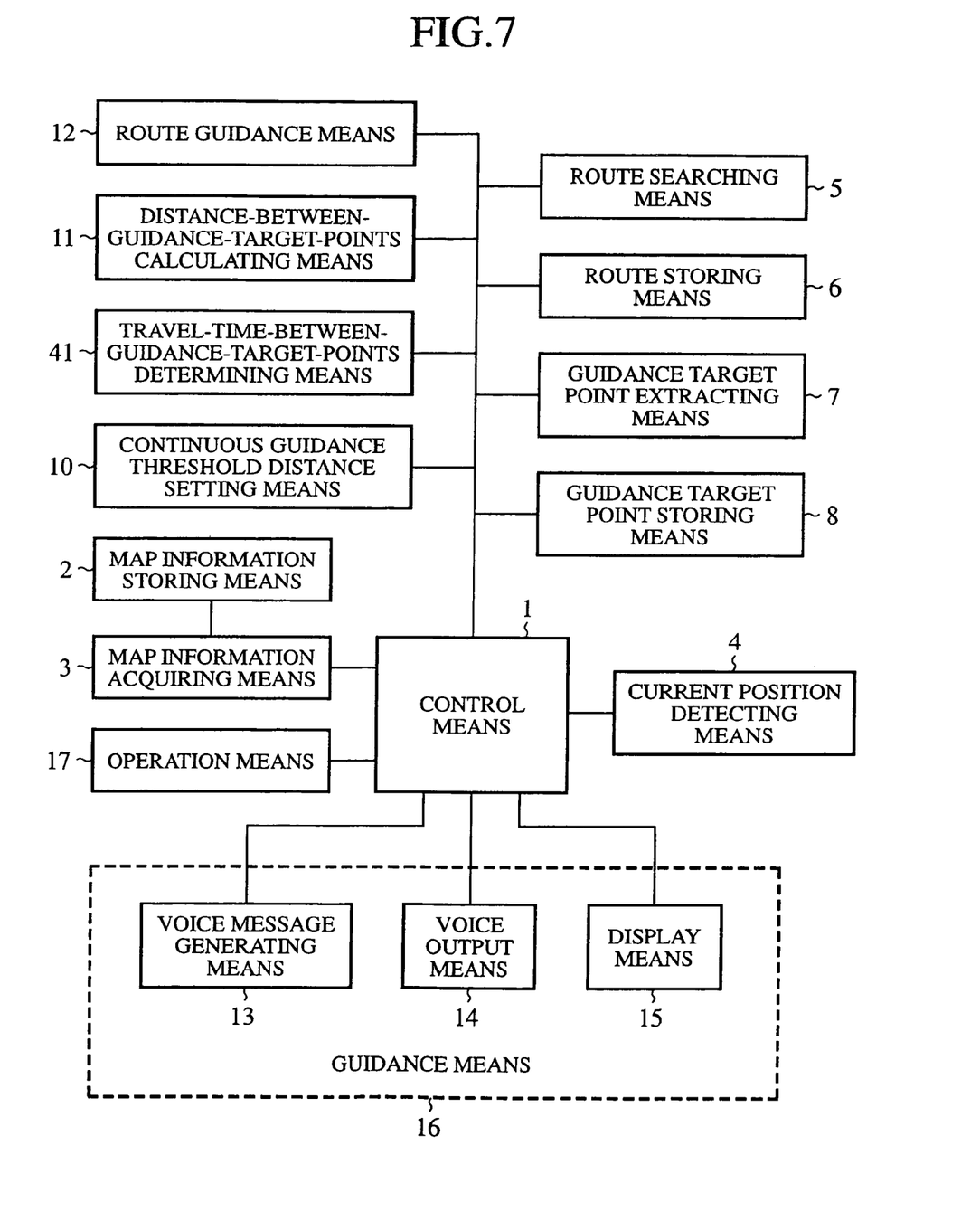
FIG. 7 is a block diagram showing the functional configuration of a vehicle navigation system in accordance with embodiment 2 of the present invention.

FIG. 7 is a block diagram showing the functional configuration of a vehicle navigation system in accordance with embodiment 2 of the present invention. The same components as shown in FIG. 1 are designated by the same reference numerals.

The vehicle navigation system in accordance with this embodiment 2 differs from that in accordance with above-mentioned embodiment 1 in that while the vehicle navigation system in accordance with embodiment 1 sets a threshold distance L for continuous guidance based on information about a configuration of a road between two successive guidance target intersections, such as the number of lanes of the road, the road width, the difference between the headings at the two successive guidance target intersections or the turn angle at the first one of the two successive guidance target intersections, the vehicle navigation system in accordance with this embodiment 2 sets the threshold distance L for continuous guidance based on a travel time required for the vehicle to travel between the two successive guidance target intersections.

To this end, the vehicle navigation system in accordance with this embodiment 2 is provided with travel-time-between-guidance-target-points determining unit 41 for determining a travel time required for the vehicle to travel between two successive guidance target intersections, as shown in FIG. 7, instead of the road-between-guidance-target-points configuration determining unit 9 of FIG. 1 (showing the functional configuration of the vehicle navigation system in accordance with embodiment 1). The other components of the vehicle navigation system in accordance with this embodiment 2 are the same as those of the vehicle navigation system in accordance with embodiment 1, and are designated by the same reference numerals as shown in FIG. 1. Therefore the explanation of those components will be omitted hereafter.

Furthermore, the vehicle navigation system in accordance with this embodiment 2 has the same hardware configuration as shown in FIG. 2, and the travel-time-between-guidance-target-points determining unit 41 can be implemented via processes performed by a control unit 21 as shown in FIG. 2.

In addition, the vehicle navigation system in accordance with this embodiment 2 basically carries out the same continuous guidance processing as shown in FIG. 3 and performed by that in accordance with embodiment 1. However, processes of steps ST1 and ST2 are different from those performed by the vehicle navigation system in accordance with above-mentioned embodiment 1.

In other words, in the vehicle navigation system in accordance with this embodiment 2, the travel-time-between-guidance-target-points determining unit 41, in step ST1, acquires either a travel time required for the vehicle to travel on a road between first and second guidance target intersections A and B or a speed limit on the road, which is prestored in link information included in map data. The reason why either the travel time required for the vehicle to travel on the road between the first and second guidance target intersections A and B or the speed limit on the road is acquired in step ST1 is because when the travel time is short or when the speed limit on the road between the two successive guidance target intersections is high, there is a high possibility that the vehicle passes through the first guidance target intersection at a high speed and then arrives at the second guidance target intersection in a short time and it is therefore preferable to set the threshold distance L for continuous guidance to a longer one.

A continuous guidance threshold distance setting unit 10 then, in step ST2, determines the threshold distance L for continuous guidance by using a table showing a relationship between either the travel time required for the vehicle to travel on the road between first and second guidance target intersections A and B or the speed limit on the road, which is acquired in step ST1, and the threshold distance L for continuous guidance.

After that, the vehicle navigation system in accordance with this embodiment 2 carries out steps ST3 and ST4 or ST5 in the same way as that of above-mentioned embodiment 1 so as to provide continuous guidance or single guidance for the user. In step ST2, instead of using the table, the continuous guidance threshold distance setting unit 10 can set the threshold distance L for continuous guidance by using either of the following methods:

(1) When the above-mentioned travel time, which is acquired in step ST1, is equal to or less than a predetermined value or when the above-mentioned speed limit, which is acquired in step ST1, is equal to or greater than a predetermined value, the continuous guidance threshold distance setting unit 10 can set the threshold distance L for continuous guidance to longer than a reference distance. In contrast, when the travel time is greater than the predetermined value or when the speed limit is less than the predetermined value, the continuous guidance threshold distance setting unit 10 can set the threshold distance L for continuous guidance to shorter than the reference distance. The continuous guidance threshold distance setting unit 10 then prestores the set threshold distance L for continuous guidance therein.

(2) The continuous guidance threshold distance setting unit 10 prestores a relational expression that associates the above-mentioned travel time or speed limit with the threshold distance L for continuous guidance, and calculates and sets the threshold distance L for continuous guidance corresponding to the actual information acquired in step ST1 according to the above-mentioned relational expression.

The above explanation of embodiment 1 provided by referring to FIG. 3 is given by taking the navigation system (i.e., a product) as an example. Furthermore, in accordance with embodiment 1, a route guidance method which this navigation system employs can include the processes as shown in FIG. 3. In other words, step ST1 is the process of determining either the travel time required for the vehicle to travel on the road between the two successive guidance target intersections A and B whose information is extracted from the guidance target point storing unit 8 or the speed limit on the road, and step ST2 is the process of setting the threshold distance L for continuous guidance based on the travel time or speed limit determined in step ST1. Furthermore, step ST3 is the process of calculating the distance between the two successive guidance target intersections A and B whose information is extracted from the guidance target point storing unit 8, and steps ST3 and ST4 are the process of providing continuous guidance for the user through the guidance unit 16 when the calculated distance between the two successive guidance target intersections A and B is equal to or shorter than the set threshold distance L for continuous guidance. Steps ST3 and ST5 are the process of providing single guidance for the user through the guidance unit 16 when the calculated distance between the two successive guidance target intersections A and B is longer than the set threshold distance L for continuous guidance.

As can be seen from the above description, even when either the travel time required for the vehicle to travel on a road between two successive guidance target intersections A and B or the speed limit on the road is small enough to raise a possibility that the vehicle reaches the second guidance target intersection in a short time after passing through the first guidance target intersection, the driver can drive the vehicle to pass through the second guidance target intersection B while keeping calm.

As mentioned above, in accordance with this embodiment 2, the vehicle navigation system determines either the travel time required for the vehicle to travel on a road between two successive guidance target intersections or the speed limit on the road based on a travel time or speed limit stored in each link information included in map information data, sets a threshold distance L for continuous guidance according to the determined travel time or speed limit by using a conversion table or by using a method of correcting a predetermined reference distance, or the like, calculates the distance between the two successive guidance target intersections, and provides continuous guidance for the driver when the calculated distance between the two successive guidance target intersections is shorter than the threshold distance L for continuous guidance. When two or more guidance target intersections successively exist on the road on which the vehicle is traveling, the vehicle navigation system can provide appropriate and continuous guidance for the driver according to either the travel time required for the vehicle to travel on the road or the speed limit on the road. Therefore, the vehicle navigation system can prevent the driver from making sudden lane changes and can also prevent needless continuous guidance, so that the driver can pass through intersections safely and smoothly.

Many widely different embodiments of the present invention may be constructed without departing from the spirit and scope of the present invention. It should be understood that the present invention is not limited to the specific embodiments described in the specification, except as defined in the appended claims.

What is claimed is:

1. A vehicle navigation system provided with guidance target point storing means for storing information about guidance target points, which are extracted from information about a preset route extending from a current position of a vehicle to a destination and which is based on map information, and guidance means for providing guidance on said route by voice or with display, said system comprising:

travel-time-between-guidance-target-points determining means for determining either one of a travel time required for the vehicle to travel on a road between two successive guidance target points whose information is extracted from the information stored in said guidance target point storing means or a speed limit on the road;

continuous guidance threshold distance setting means for setting a threshold distance for continuous guidance based on the travel time or the speed limit determined by said travel-time-between-guidance-target-points determining means;

distance-between-guidance-target-points calculating means for calculating a distance between the two successive guidance target points whose information is extracted from the information stored in said guidance target point storing means; and route guidance means for providing continuous guidance through said guidance means when the calculated distance between the two successive guidance target points is shorter than the threshold distance for continuous guidance set by said continuous guidance threshold distance setting means.

2. The vehicle navigation system according to claim 1, wherein said travel-time-between-guidance-target-points determining means determines, based on a travel time or speed limit prestored in each link information included in the map information, either one of the travel time required for the vehicle to travel on the road between the two successive guidance target points or the speed limit on the road, and said continuous guidance threshold distance setting means sets the threshold distance for continuous guidance based on a table showing a relationship between the travel time or the speed limit and the threshold distance for continuous guidance.

3. The vehicle navigation system according to claim 1, wherein said travel-time-between-guidance-target-points determining means determines, based on a travel time or speed limit prestored in each link information included in the map information, either one of the travel time required for the vehicle to travel on the road between the two successive guidance target points or the speed limit on the road, and when said travel-time-between-guidance-target-points determining means determines that the determined travel time is equal to or less than a predetermined value or the determined speed limit is equal to or greater than a predetermined value, said continuous guidance threshold distance setting means sets the threshold distance for continuous guidance to longer than a reference distance, and sets the threshold distance for continuous guidance to shorter than the reference distance otherwise.

4. The vehicle navigation system according to claim 1, wherein said travel-time-between-guidance-target-points determining means determines, based on a travel time or speed limit prestored in each link information included in the map information, either one of the travel time required for the vehicle to travel on the road between the two successive guidance target points or the speed limit on the road, and said continuous guidance threshold distance setting means sets the threshold distance for continuous guidance according to a relational expression showing a relationship between the determined travel time or the determined speed limit and the threshold distance for continuous guidance.

5. A route guidance method comprising the steps of:

storing information about guidance target points placed on a route extending from a current position of a vehicle to a destination;

determining a travel time required for the vehicle to travel on a road between two successive guidance target points whose information is extracted from said stored information;

setting a threshold distance for continuous guidance based on the determined travel time;

calculating a distance between the two successive guidance target points; and providing continuous guidance when the calculated distance between the two successive guidance target points is shorter than said set threshold distance for continuous guidance.

* * * * *